(12) United States Patent
Compigne et al.

(10) Patent No.: US 10,427,482 B2
(45) Date of Patent: Oct. 1, 2019

(54) LINKING ARM, FOR EXAMPLE FOR A VEHICLE WHEEL SUSPENSION, AND METHOD FOR MANUFACTURING SAME

(71) Applicant: HUTCHINSON, Paris (FR)

(72) Inventors: Camille Compigne, Fontainebleau (FR); Jean-Pierre Ciolczyk, Montargis (FR); Bertrand Florentz, Paucourt (FR)

(73) Assignee: HUTCHINSON, Paris (FR)

( * ) Notice: Subject to any disclaimer, the term of this patent is extended or adjusted under 35 U.S.C. 154(b) by 79 days.

(21) Appl. No.: 15/569,858

(22) PCT Filed: Apr. 28, 2015

(86) PCT No.: PCT/FR2015/051157
§ 371 (c)(1),
(2) Date: Oct. 27, 2017

(87) PCT Pub. No.: WO2016/174316
PCT Pub. Date: Nov. 3, 2016

(65) Prior Publication Data
US 2018/0111433 A1    Apr. 26, 2018

(51) Int. Cl.
*B60G 3/04*    (2006.01)
*B60G 7/00*    (2006.01)
(Continued)

(52) U.S. Cl.
CPC .............. *B60G 7/001* (2013.01); *B29C 69/02* (2013.01); *B60G 7/005* (2013.01); *B60G 7/008* (2013.01);
(Continued)

(58) Field of Classification Search
CPC .. B60G 3/04; B60G 7/001; B60G 2200/1424; B60G 2206/722; B60G 2206/014;
(Continued)

(56) References Cited

U.S. PATENT DOCUMENTS 5,267,751 A * 12/1993 Hiromoto ................ B60G 3/10
                                                      280/124.134
5,720,833 A     2/1998 Grube et al.
(Continued)

FOREIGN PATENT DOCUMENTS

FR         2993806       1/2014
WO       2011/141538    11/2011

*Primary Examiner* — Toan C To
(74) *Attorney, Agent, or Firm* — LEX IP MEISTER, PLLC

(57) ABSTRACT

A link arm for connecting a first unsuspended mass to a second suspended mass, and its manufacturing method are provided. In some embodiment the arm applies in particular to a suspension system for a motor vehicle, wherein the arm is able to equip a wheel suspension by having triangular housings to receive a stub axle of the wheel and two connecting links to the chassis of the vehicle. In some embodiments, the arm comprises housings to receive a first linkage joint to the first mass, and at least a second linkage joint to the second mass, and comprises:
  a stiffening portion which comprises a first thermoplastic or thermosetting matrix composite material reinforced with fibers and which comprises a peripheral rim of the arm, and
  an anti-buckling portion interposed in the stiffening portion and extending from the rim over substantially the entire arm.

25 Claims, 3 Drawing Sheets

(51) Int. Cl.
*B29C 69/02* (2006.01)
*B60G 7/02* (2006.01)
*B29K 307/04* (2006.01)
*B29L 31/30* (2006.01)

(52) U.S. Cl.
CPC ............ *B60G 7/02* (2013.01); *B29K 2307/04* (2013.01); *B29L 2031/3002* (2013.01); *B60G 2206/122* (2013.01); *B60G 2206/7101* (2013.01); *B60G 2206/7104* (2013.01); *B60G 2206/80* (2013.01); *B60G 2206/81012* (2013.01)

(58) Field of Classification Search
CPC ........ B60G 2206/016; B60G 2206/122; B60G 2204/1431
USPC .................................. 280/124.134, 124.135
See application file for complete search history.

(56) References Cited

U.S. PATENT DOCUMENTS

| | | | | |
|---|---|---|---|---|
| 7,293,787 B2 * | 11/2007 | Nunez | .................... | B60G 7/001 280/124.1 |
| 7,938,417 B2 * | 5/2011 | Ersoy | .................... | B60G 7/001 280/124.134 |
| 8,459,674 B2 * | 6/2013 | Mielke | .................... | B60G 3/04 280/124.134 |
| 9,937,764 B2 * | 4/2018 | Ito | .................... | B21D 22/26 |
| 10,160,275 B2 * | 12/2018 | Meier | .................... | B60G 7/005 |
| 2003/0034625 A1 * | 2/2003 | Runte | .................... | B60G 7/001 280/124.134 |
| 2007/0284841 A1 * | 12/2007 | Kunze | .................... | B60G 7/001 280/124.135 |
| 2013/0328283 A1 * | 12/2013 | Korte | .................... | B21D 53/90 280/124.134 |

* cited by examiner

Fig.4
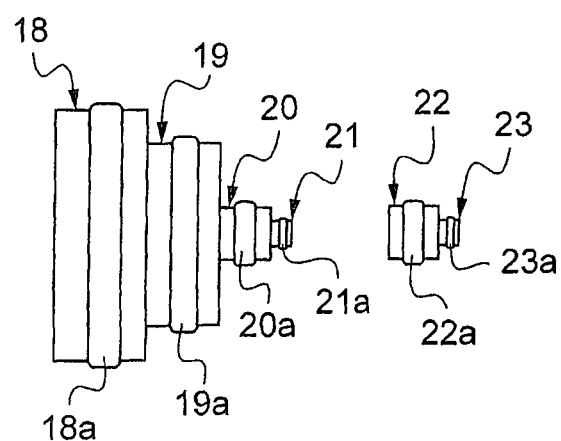
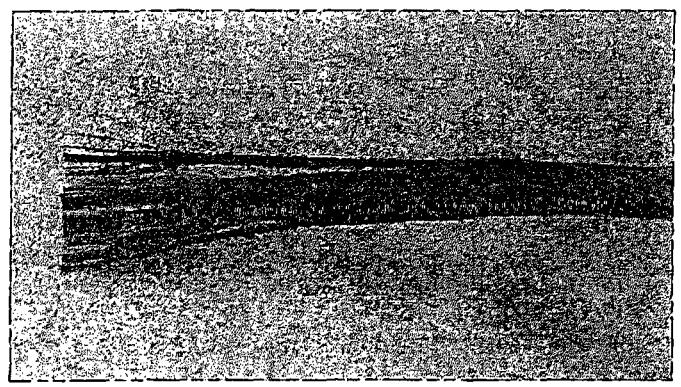
Fig.5
Fig.6
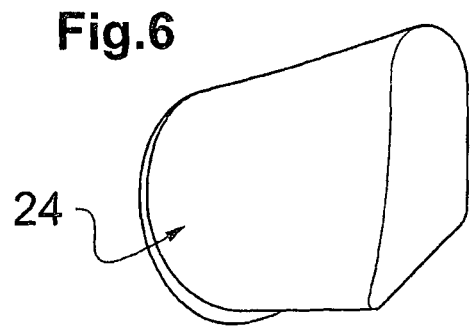

LINKING ARM, FOR EXAMPLE FOR A VEHICLE WHEEL SUSPENSION, AND METHOD FOR MANUFACTURING SAME

FIELD OF THE INVENTION

The present invention relates to a link arm adapted to connect together two structures or masses subjected to forces, and a method of manufacturing this arm. The invention applies in particular to a suspension system for a front or rear wheel train of a motor vehicle, in a wheel suspension which, in particular, comprises housings receiving, on the one hand, a linkage joint to a stub axle and, secondly, at least one linkage joint for example to the chassis of the vehicle.

BACKGROUND OF THE INVENTION

In a known manner, the suspension systems of motor vehicles incorporate suspension arms which comprise a ball joint at the stub axle and two linkage joints to the chassis of the vehicle, wherein these three joints together form a triangle giving the arm an overall triangular shape. These link arms are generally metallic and therefore relatively heavy.

In recent years, efforts have been made to lighten such metal arms by using composite materials, for example, as in document U.S. Pat. No. 5,267,751, which discloses a triangular suspension link arm whose three perimeter sides are formed of continuous and unidirectional longitudinal fibers impregnated with a resin and only interconnected by the three vertices of the triangle, without a central portion extending from these sides. This arm is provided with protection plates forming mounting brackets and supports rigidly fixed to the frame, i.e. not articulated.

The document WO-A1-2011/141538 teaches the production of a triangular link arm for a suspension of the type receiving a connecting ball of the stub axle and two joints for connection to the chassis, in a molded hollow shell comprising two half-shells. The arm has a rim forming a peripheral boss which defines a cavity on the perimeter of the arm, wherein each half-shell is formed by several layers of a composite material based on oriented fibers impregnated with a polymeric matrix. The shell receives in its internal cavity a metallic ductile core at the junction between the two half-shells, wherein this core is covered by the half-shells only in an intermediate zone of the shell located towards the inside of its hollow rim. One or more reinforcing layers of the arm are attached to an outer side face of its rim.

A major disadvantage of these known link arms lies in their inertia, their rigidity and their sometimes unsatisfactory resistance in use to tensile-compressive, flexural and buckling stresses and also to extreme incidental forces, to obtain a quite relative alleviation.

SUMMARY OF THE INVENTION

An object of the present invention is to provide a link arm adapted to connect a first structure or mass, for example unsuspended, to a second structure or mass, for example suspended, which allows these disadvantages to be overcome, wherein the arm comprising the housings is respectively adapted to receive a first linkage joint to the first structure or mass, and at least a second linkage joint to the second structure or mass, the wherein arm comprises:
  a main stiffening portion which is formed of a first thermoplastic or thermosetting matrix composite material reinforced with fibers and which comprises a peripheral rim of the arm to form a stiffening perimeter for the arm, and
  an anti-buckling portion which is interposed in the stiffening portion and which extends from the flange over substantially the entire arm.

For this purpose, an arm according to the invention has fibers that are continuous and joined in the form of a main continuous coiled skein of the first fibers extending along the rim, which encloses the anti-buckling portion.

By "skein" is meant in the present description a hank of adjacent continuous fibers which are assembled substantially linearly in a given geometric configuration, and which is particularly easily achieved by winding.

It is to be noted that this skein of continuous fibers oriented along the peripheral rim of the arm is particularly suitable for working in tension-compression when in use and provides rigidity and, in particular, high strength to the arm, together with a very satisfactory buckling resistance by means of the anti-buckling portion that is clamped by the stiffening portion, while providing significant relief for the arm in comparison with metal arms.

It should also be noted that the forces to be transmitted are advantageously concentrated in a multitude of fibers constituting this skein and located in the outermost peripheral area of the arm forming a ribbed stiffening rim, which makes it possible to maximize the inertia, the resistance and the stiffness of the arm. As for the anti-buckling portion, it allows absorption of the buckling forces resulting from compression in this peripheral area. As will be explained below, this anti-buckling portion may be in the form of a median plane web reinforced on both sides by secondary skeins forming sub-triangulations of the peripheral rim of the arm forming a main stiffening perimeter for this arm.

It should be further noted that, as a thermoplastic matrix for impregnating and coating the fibers, it is possible to use any thermoplastic polymer suitable for the suspension arms and in particular polyamides (PA) such as, for example, PA6, PA66, PA4.6, PA12 and phenylene polysulfides (PPS), without limitation.

As regards thermosetting matrices that may be used for these fibers, mention may be made, for example, of epoxy resins and polyester resins, without limitation.

According to another characteristic of the invention, the stiffening portion may form an outer peripheral shell for the arm comprising two substantially flat half-shells which form ribs for the arm reinforced by the main skein, wherein the anti-buckling portion is inserted between the two half-shells.

It will be noted that this anti-buckling portion may be advantageously situated in the median longitudinal plane of the arm, wherein this plane, in the preferred case of a molded part, serves as a demolding joint plane of the arm.

It will also be noted that such an arm according to the invention stiffened by such a composite material may thus be obtained by assembling two complementary and more or less symmetrical preforms in a tool, such as a mold, as explained hereinafter.

According to another characteristic of the invention, the main skein may be substantially unidirectional (i.e. comprising a straight assembly of a hank of quasi-parallel fibers forming a hank) and it may optionally be enclosed in a main tubular sheath which is, for example, woven, knitted or braided.

It will be noted that this advantageously textile sheath makes it possible to protect the quasi-unidirectional skein that it encloses against external constraints both during the manufacturing process of the arm as well as in use, while facilitating handling and positioning in the molding process of the part.

Advantageously, the arm may be adapted to equip a suspension of a wheel of a motor vehicle and may then comprise three of the housings arranged in a triangle and respectively adapted to receive the first joint formed by a ball joint to a stub axle constituting the first unsuspended mass, wherein the two second axial joints connecting to a frame of the vehicle constitute the second suspended mass, and wherein the first fibers may be chosen from the group consisting of continuous carbon, glass, aramid fibers (e.g. trade name Kevlar®), flax, basalt (or other natural fibers) and combinations of at least two of the fibers.

It should be noted that it is advantageous to use as continuous quasi-unidirectional fibers in the present invention, such selected fibers in their highest version by weight or level, so that these fibers may be used for the spokes on the rim and inside the arm while remaining sufficiently tight.

According to a preferred embodiment of the invention, the anti-buckling portion has at least one area having a perimeter located towards the inside of the rim which is not covered by the stiffening portion, so that this at least one area forms a web defining a minimum thickness for the arm.

The stiffening portion may then advantageously further comprise at least one connecting section which extends inwards from the rim to which it is connected, and which delimits with the rim the two reinforced areas on their respective perimeters towards the inside and along the main skein in the rim and in the connecting section, by a first skein of the second continuous fibers and by a second auxiliary skein of the third continuous fibers. Depending on the shape and size of the link arm, these auxiliary skeins may be declined as many times as necessary to form as many sub-triangulations of the main skein as necessary to ensure buckling stability. These auxiliary skeins nested in the main skein thus form sub-triangulations to stiffen and relieve the main stiffening perimeter.

According to this preferred embodiment of the invention, the first auxiliary skein and the second auxiliary skein may each be advantageously substantially unidirectional and respectively enclosed in two auxiliary tubular sheaths, for example made of woven, knitted or braided textile, wherein the second fibers and third fibers are, for example, identical to the first fibers.

Also according to this embodiment, one of the housings adapted to receive a second articulation may have a substantially circular edge defined by the rim and by another connecting section connected to the flange, wherein the edge is reinforced inwards of the main skein and a second auxiliary skein by a third auxiliary skein of the fourth continuous fibers.

Also according to this embodiment, the third auxiliary skein may be substantially unidirectional and may be enclosed in another auxiliary tubular sheath, for example woven, knitted or braided textile, wherein the fourth fibers are for example identical to the first fibers, second fibers and third fibers.

It will be noted that it is thus possible to provide more than two auxiliary sub-triangulation skeins.

Also according to this preferred embodiment, the stiffening portion may advantageously further comprise filling inserts which are located between the main skein and at least one of the first auxiliary skeins and second auxiliary skeins and/or in curved regions and/or in the immediate vicinity of the first joint and/or of the at least one second joint, wherein the filling inserts are, in particular, adapted to reduce the effects of folding or unfolding stresses applied to the arm when in use and/or to oppose the starting of fatigue cracks and/or to oppose the local buckling of the arm in the curved regions.

Still according to this embodiment, the housing adapted to receive, for example by press-fitting, the first joint formed by the ball joint, may be formed on a plate provided on the arm, and which is assembled to be in contact with the stiffening portion and the anti-buckling portion, and wherein the plate encloses a portion of the rim.

It will be noted that, depending on the shape and length of the plate, it is possible to adapt the vehicle track by changing the length of this plate. This choice of fixing the plate receiving the ball on the link arm allows, in the case of a single link arm manufactured according to a specific tool and method, this arm to be mounted on different vehicle models using a respectively suitably adapted plate.

It will also be noted that this plate is designed to transmit a maximum of force through its surfaces in contact with the peripheral rim of the arm stiffened by the fibers comprising this rim, and to minimize the forces in the fixing screws that may be used for the assembly of the plate to the arm.

As a variant of this plate, the ball joint may be fitted directly into a joint mounted in a housing provided for this purpose at a vertex of the arm.

In general with reference to all of the aforementioned characteristics, the anti-buckling portion may be advantageously formed by a web of a second thermoplastic or thermosetting matrix composite material reinforced with web fibers identical or different from the fibers of the first composite material, and which may be selected from the group consisting of continuous fibers of carbon, glass, aramid, flax, basalt (or other natural fibers) and combinations of at least two of the fibers Advantageously, this composite web may comprise at least two superimposed layers of fabrics based on the web fibers which are, for example, multiaxial fabrics (i.e. with fiber orientations at different angles in the superimposed layers).

It will be noted that fabrics of the "NCF" (for "Non Crimp Fabric") type, for example of the biaxial type, may be used. It is generally possible to use layers oriented in such a way as to obtain angles opitimizing the mechanical strength of the arm.

It will also be noted that this composite web may be easily cut by automated means into external shapes that may be complex (e.g. rounded, straight, faceted, etc.), and that this composite material used for the web makes it possible to obtain a preform at a lower cost with a maximum level of performance that effectively resists buckling.

Alternatively, the anti-buckling portion may be formed by a web of a metallic material, which has the advantage of being easier to obtain and therefore offers reduced manufacturing cost in comparison with a composite web. In fact, it is sufficient to cut, possibly stamp, the desired shape out of a plate, for example of steel, so that it is ready to receive the main skein of continuous fibers substantially undirectionally on its periphery.

Regarding such a hybrid link arm with a composite stiffening portion and metal anti-buckling web, it should also be noted that it is possible to crimp the ball directly into this metal web and provide additional weight gain (thanks to the absence of the aforementioned plate) despite the impossibility of adapting this crimped arm to different vehicle models.

A manufacturing method according to the invention of a link arm as defined above whose stiffening portion comprises two half-shells superimposed on either side of the anti-buckling portion, comprises the following steps:

a) winding a main hank of the first continuous fibers on at least one mandrel to obtain the main skein for each half-shell, b) preforming the main skein on a main impression to obtain a main preform of each half-shell, c) insertion into a mold of the main preform, of the anti-buckling portion and of the housings for the first joint and the at least one second joint, for the two half-shells, then d) injection into the mold, for example by resin transfer molding ("RTM"), of the thermoplastic or thermosetting matrix in contact with the main skein, the anti-buckling portion and the housing, to obtain the two half-shells superimposed and integral with the anti-buckling portion.

According to the preferred embodiment of the invention, this method may comprise the following steps:

a) winding on the at least one mandrel of the main hank, of a first auxiliary hank of the continuous fibers and of a second auxiliary hank of the third continuous fibers, to obtain the main skein and the first and second auxiliary skeins, b) preforming the main skein, the first skein and the second skein to obtain a preform comprising the main preform, a first auxiliary preform and a second auxiliary preform, c) insertion in the mold of the main preform surrounding the first auxiliary preform and the second auxiliary preform, the anti-buckling portion and the housing, and d) injection in the mold of the matrix at least in contact with the main skein, the first auxiliary skein and the second auxiliary skein, the anti-buckling portion and the housing.

It will be noted that this manufacturing method according to the invention makes it possible to obtain link arms presenting both very high rigidity and strength, while using preforms which are relatively easy to produce and therefore incurring a reduced cost of production.

According to an alternative embodiment of the invention, it is possible in the above-mentioned step a) to carry out a continuous winding from one and the same hank of substantially unidirectional continuous fibers on a single mandrel, wherein this mandrel possibly consists of two parts of the extractable or "web" type mandrel which remains in the part so obtained. More precisely, this single mandrel winding may be produced for each half-shell successively by:

an initial triangulation winding around the three joint housings (i.e. the force transfer and the connection of the three housings), a complementary reinforcement winding at these three housings, and a final winding to finish the filling of each half-shell preform.

BRIEF DESCRIPTION OF THE DRAWINGS

Other characteristics, advantages and details of the present invention will emerge upon reading the following description of several exemplary embodiments of the invention, given by way of illustration and not limitative, wherein the description is made with reference to the accompanying drawings, among which:

FIG. 4 shows a photograph of a hank of continuous and substantially unidirectional fibers that may be used to reinforce the stiffening portion of an arm according to the invention, such as that of FIG. 1 or 2, FIG. 5 shows a diagrammatic view illustrating step a) of winding six main and auxiliary fibers of continuous fibers on six mandrels according to an embodiment of the invention, to obtain preforms intended to reinforce this arm, FIG. 6 shows a schematic view of a preforming impression for pre-consolidating one of the auxiliary skeins wound in FIG. 5.

DETAILED DESCRIPTION OF THE INVENTION

Figure 1:
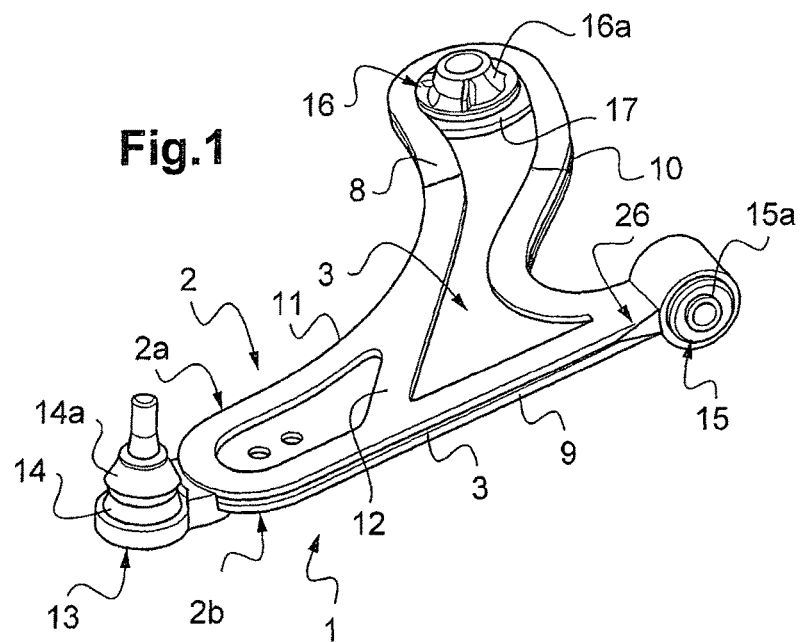
FIG. 1 shows a view from above and in perspective of a link arm for a motor vehicle suspension according to an example of the invention.
Figure 2:
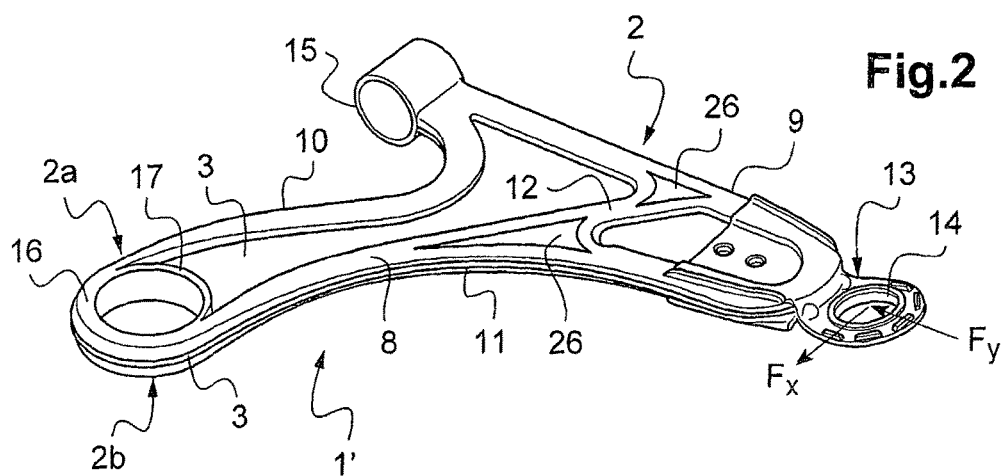
FIG. 2 shows a view from above and in perspective of a link arm similar to that of FIG. 1, but which is distinguished, in particular, by its stiffening portion and its plate intended to receive the ball joint.

Generally speaking, with reference to FIGS. 1 and 2, the two second joints comprising a link arm according to the generally triangular suspension invention may be oriented not only along axes perpendicular to each other, respectively horizontal and vertical, as in these figures. but in any other direction depending on the configuration of the first unsuspended mass concerned (e.g. the wheel train) and its connection to the second suspended mass (e.g. chassis).

As may be seen in FIGS. 1 and 2, a link arm 1, 1' according to the invention for a motor vehicle suspension essentially comprises a stiffening portion 2 or shell formed of two identical half-shells 2a and 2b superimposed with intercalation of an anti-buckling web 3 in the median longitudinal plane of the shell 2 thus obtained. Each half-shell 2a, 2b is made of a thermoplastic or thermosetting matrix composite material reinforced by skeins 4, 5, 6, 7 of substantially unidirectional continuous fiber hanks (these skeins 4 to 7 are visible in FIG. 7).

Preferably, these fibers are chosen for this application from high strength carbon fibers, such as, for example, carbon fibers of 50k designation, which makes it possible to minimize the manufacturing cost of the arm 1, while improving the efficiency of the process.

Alternatively, it is also possible to use:

glass fibers, such as those known under the name Glass E preferably or Glass S (with a specification of 4800 tex), aramid fibers (e.g. Kevlar® k49 or k29), flax fiber, basalt fibers, and/or other natural fibers.

As explained above, it is advantageous in the case of these fibers to use those having the highest basic weight, so that the corresponding skeins 4, 5, 6, 7 may be used for the spokes on the rim and inside the arm 1, 1' without losing their tension.

Hanks of these continuous fibers are conventionally obtained from a spool, wherein these strands are, for example, such as the hank of high-strength carbon fibers illustrated in FIG. 4.

As may be seen in FIGS. 1 and 2, each half-shell 2a, 2b has a shape generally corresponding to the periphery of a triangle, comprising a flat rim 8 extending only on the three sides 9, 10, 11 of the triangle and on a connecting section 12 connecting two of these sides 9 and 11 to one another. In other words, each half-shell 2a, 2b is empty inside the flange 8, on either side of the connecting section 12.

More specifically, each half-shell 2a, 2b is defined in this embodiment by:

a first substantially rectilinear side 9 extending from a first vertex of the triangle adjacent to a plate 13 (which is external to the half-shells 2a, 2b and defines a first housing 14 receiving a ball joint 14a connecting to a wheel stub axle), to a second housing 15 to a second vertex of the triangle receiving an axial joint 15a for connection to the, for example horizontal, axis chassis, a second successively concave and then convex second side 10 extending in am ingoing and concave profile starting from the second housing 15 and bending to finish with an outgoing and convex profile to a third vertex of the triangle where a third housing 16 receiving another axial joint 16a for connection to the axis frame, for example vertical, and a third generally concave side 11 which extends in a continuously recessed and concave profile from the third housing 16 to the first housing 14, and which is connected to the first side 9 by the connecting section 12 which is itself substantially straight and is inclined with respect to the first side 9 while being generally parallel to the convex curvature of the second side 10.

Even more specifically, it may be seen in FIGS. 1 and 2 that the circular-shaped third housing 16 is delimited half-way by the convex contour in a semicircle of the third vertex and half-way by the concave contour of another section 17 which extends this convex contour between the second and third sides 10 and 11 to form an inner edge of the third housing 16.

We see in FIGS. 1 and 2 that the ball 14a is fixed, for example, by crimping it on the plate 13 which is assembled here by screwed half-shells 2a, 2b. As for the second and third housings 15 and 16, they are respectively defined by composite rings that may receive the corresponding joints 15a and 16a by press fitting or overmolding.

The anti-buckling web 3, which is also of a generally triangular shape (its profile corresponds to that of each half-shell 2a, 2b), is inserted between the half-shells 2a, 2b and occupies substantially all their surface, since this web 3 extends continuously from the respective inner edges of the three housings 14, 15, 16 of each half-shell 2a, 2b. As explained above, the web 3, which has a minimum thickness for the arm 1, 1' (much lower than that of each half-shell 2a, 2b) is mainly designed to prevent buckling of the arm 1, 1' when it is highly stressed. The web 3 may also be made of a thermoplastic or thermosetting matrix composite material reinforced with fibers, or alternatively a metallic material, for example, steel. Preferably, this web 3 comprises several superimposed composite layers of multiaxial tissues such as biaxial "NCF" layers.

Figure 3:
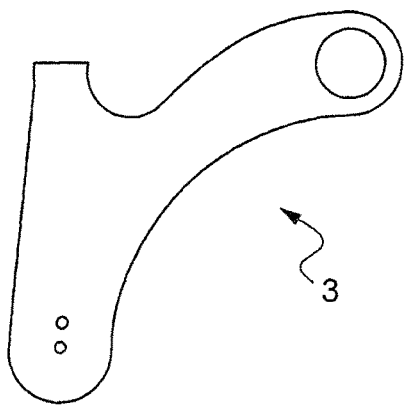
FIG. 3 shows a plan view of a preform of an anti-buckling web that may be used to manufacture the arms of FIG. 1 or 2.

FIG. 3 shows an example of a profile that may be used for a preform of the web 3, which has been cut in a precise and automated manner.

FIGS. 5 to 8 illustrate the implementation of a method for manufacturing an arm 1, 1' such as that of FIG. 1 or 2, according to an example of the invention using a plurality of mandrels 18, 19, 20, 21, 22, 23 for the winding of continuous hanks 18a, 19a, 20a, 21a, 22a, 23a (wherein it is specified that it is also possible to use a single mandrel, as explained above).

According to this example of FIG. 5, it begins by winding the hanks 18a to 23a respectively around the mandrels 18 to 23, wherein each hank 18a to 23a is previously powdered or impregnated to facilitate its subsequent handling. Thus, several elementary preforms are obtained in the form of as many skeins 4, 5, 6, 7 of continuous hanks. In the example illustrated in FIG. 5 relating to the manufacture of a suspension arm, six mandrels 18 to 23 receiving six hanks 18a to 23a are used, among which there are four different mandrels 18 to 21 and as many different skeins 4 to 7 are obtained following this first winding step. The number and the respective diameters of the mandrels are defined according to the perimeters of the skeins to be obtained corresponding to their arrangement on the peripheral rim 8 and inside each half-shell 2a, 2b.

More precisely, in this embodiment there is thus obtained a main skein 4 intended to reinforce the flange 8 of each half-shell 2a, 2b, and three auxiliary skeins 5, 6, 7 respectively intended to reinforce internal perimeters of the rim 8 on either side of the connecting section 12 and the edge 17 of the third housing 16.

The pre-consolidation of each main skein 4 and auxiliary skein 5, 6, 7 thus obtained (see FIG. 7) is then carried out and it is wrapped in a tubular protective mesh sheath (not shown), for example in the form of braided, woven or knitted textile, on a preforming impression 24 corresponding to the shape sought for the skein 4, 5, 6, 7 within each half-shell 2a, 2b, as shown in FIG. 6 which shows an impression 24 for the auxiliary skein 5 that is used to reinforce the perimeter delimited by the connecting section 12, a part of the first side 9 and the adjacent part of the third side 11.

Figure 7:
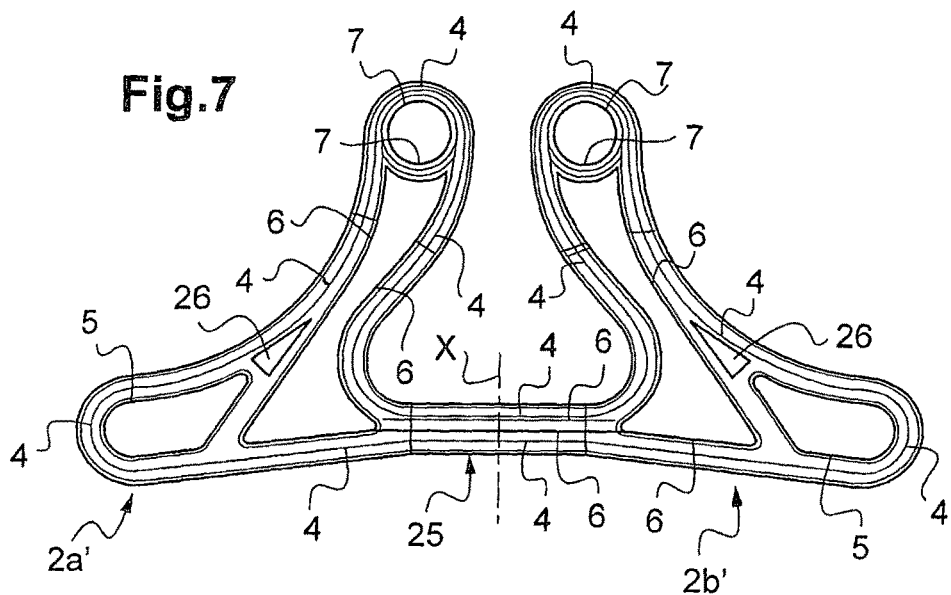
FIG. 7 shows a schematic view showing two symmetrical preforms intended to form two half-shells and each containing the skeins of fibers obtained in FIG. 5 and pre-consolidated according to FIG. 6, before insertion into a mold.

As illustrated in FIG. 7, two identical preforms 2a', 2b' of the half-shells 2a, 2b are joined together by a connecting segment 25 linearly extending their rims 8 between their respective second vertices 15 and are respectively intended to form the two half-shells 2a, 2b (these preforms 2a', 2b' are symmetrical to one another with respect to a median axis X of this segment 25). The main skein 4 which extends continuously over the peripheral rims 8 of the two preforms 2a', 2b' serves to take up the main bending forces by maximizing the inertia of the triangle formed by the arm 1, 1'. finally obtained, in a bending plane mode of this triangle.

First and second auxiliary skeins 5 and 6 are provided towards the inside of the main skein 4 and are respectively situated on either side of the connecting section 12, also extending along a part of the first and third sides 9 and 11 (to the first vertex for the first auxiliary skein 5 and to the third vertex for the second auxiliary skein 6). These auxiliary skeins 5 and 6, which form internal triangulations to the generally triangular main skein 4 serve to reinforce this main skein 4, in particular when the skein is of curved or particularly long shape (as is the case with FIG. 7), in particular to prevent it from deforming by buckling. It may be seen in FIG. 7 that the respective second auxiliary skeins 6 of the two preforms 2a', 2b' are also interconnected by extending continuously along the connecting segment 25.

FIG. 7 also shows for each preform 2a', 2b' a third auxiliary skein 7 arranged in a circular manner around the periphery of the edge 17 of the third housing 16, towards the inside of the main skein 4 and the second auxiliary skein 6.

Finally, FIGS. 2 and 7 show counterforms or filling inserts 26 having a geometry, for example, triangular, that may be advantageously added to the skeins 4 to 7 as required, at intersections between these skeins 4 to 7 to avoid vacuum zones that could generate fatigue crack starts, provide local anti-buckling support for the curved zones of the skeins 4 to 7 with a small radius of curvature and/or reduce unfolding stresses. In the examples of FIGS. 2 and 7, there is thus added for each preform $2a'$, $2b'$ one or two filling counterforms 26 in the connection area of the connecting section 12 with the first and/or third sides 9, 11 of the rim 8, between the main skein 4 and the first and second auxiliary skeins 5 and 6.

FIG. 1 shows another possible location for such a filling counterform 26, which is inserted here in the immediate vicinity of the second housing 15 receiving the joint $15a$ of horizontal axis.

Figure 8:
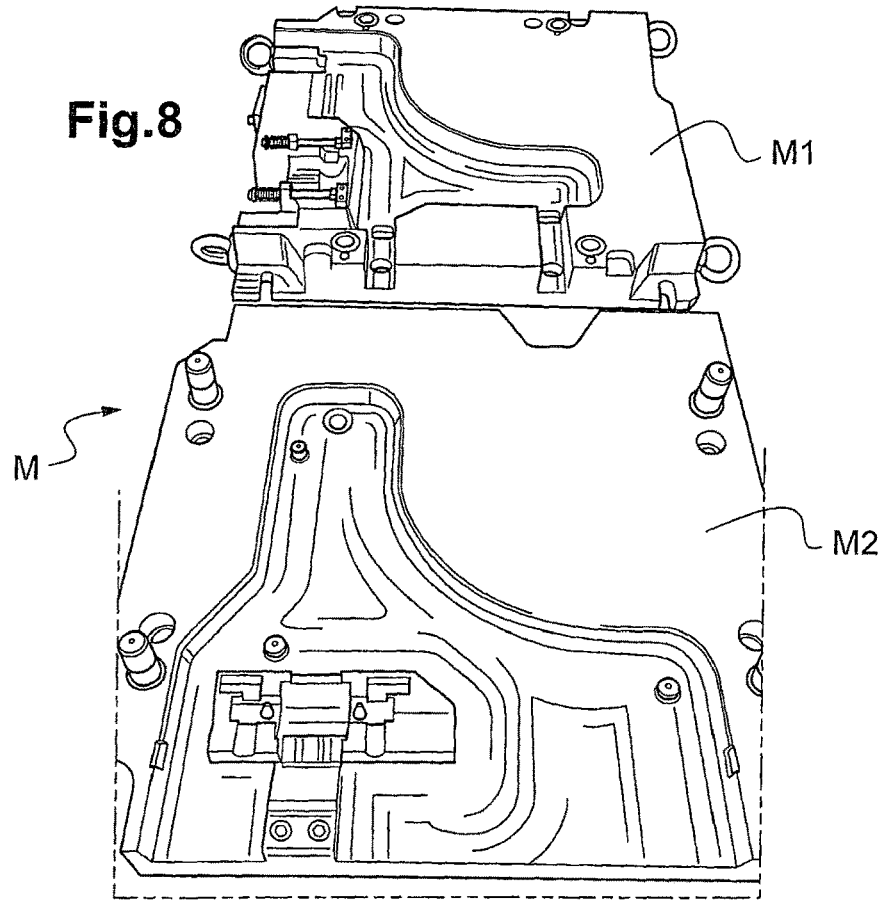
FIG. 8 shows a top view in perspective of the upper and lower parts respectively of a split mold used as an example to implement steps c) and d).

The preforms $2a'$, $2b'$ thus obtained are then placed in an open mold M such as that illustrated in FIG. 8 which is characterized by a so-called closure mode in the split-mold (this "split" mold M is advantageously usable in the presence of a joint $15a$ of horizontal axis as is that received in the second housing 15), then there is the anti-buckling web 3 and the composite rings forming the housings 15 and 16 of the second and third joints $15a$ and $16a$.

After closure of the mold M by placing its lower part M1 and upper part M2, the thermoplastic or thermosetting matrix is injected in a single molding operation carried out using an "RTM" type technique to wrap the various skeins 4 to 7 and thus obtain the two half-shells $2a$, $2b$ secured to both sides of the buckling web 3.

As may be seen in FIGS. 1 and 2, the plate 13 receiving the ball $14a$ and encapsulating part of the rim 8 and the web 3 is assembled at the location of the first vertex. As explained above, the plate 13 attached to the arm 1, 1' represents only one possibility among others for the mounting of the ball $14a$, wherein this possibility nevertheless has the advantage of allowing the arm 1, 1' to be adapted to different vehicle models by changing the length of the plate 13 for the same arm 1, 1'.

In summary and as particularly visible in FIG. 2, a link arm 1, 1' according to the invention may effectively withstand the extreme incidental forces Fx and Fy whose ball $14a$ is the source (the Fy force is substantially directed along the first rectilinear side 9 of the arm 1, 1' to the second side 10, while the force Fx is perpendicular to Fy as it is directed towards the third concave side 11). The main peripheral skein 4 transmits these main forces to the joints $15a$, $16a$ and the ball $14a$.

More specifically, it should be noted that:
during such a force defined mainly by the component Fx, the third side 11 of the rim 8 works essentially in compression, while the first and second sides 9 and 10 of the rim 8 both work slightly in tension, and that
during such a force defined mainly by the component Fy, this first side 9 works essentially in compression while these second and third sides 10 and 11 work slightly in tension.

The tests carried out by the applicant show that the present invention makes it possible to obtain link arms 1, 1' providing a weight gain that is:
greater than 60% if both the stiffening portion 2 and the anti-buckling web 3 are made of composite materials exclusively reinforced with carbon fibers, in comparison with an arm of similar shape but made entirely of metal;
of the order of 30% if both the stiffening portion 2 and the anti-buckling web 3 are made of composite materials, but with carbon fibers used to strengthen the stiffening portion 2 and glass fibers to strengthen the web 3; and
of the order of 40% if only the stiffening portion 2 is made of a composite material reinforced with carbon fibers, while the anti-buckling web 3 is made of steel.

Therefore, the use of continuous carbon fibers to reinforce at least the stiffening portion 2 and, optionally furthermore, the web 3 constitutes a preferred embodiment of the invention, thanks to the very interesting specific properties of the carbon fibers, of the high-strength in particular type for use in the arms 1, 1' in a motor vehicle suspension device. In practical terms, the three alternatives mentioned above make it possible to obtain a weight saving per vehicle of between 0.77 kg (i.e. about 77 mg of $CO_2$ lower emission) and 1.5 kg (i.e. about 150 mg of CO2 lower emission).

The invention claimed is:

1. A link arm adapted to connect a first structure or mass to a second structure or mass, wherein the arm comprises housings respectively adapted to receive a first linkage joint to the first structure or mass and at least one second linkage joint to the second structure or mass, wherein the arm comprises:
   a stiffening portion which is formed of a first thermoplastic or thermosetting matrix composite material reinforced with fibers and which comprises a peripheral rim of the arm, and
   an anti-buckling portion which is interposed in the stiffening portion and which extends from the rim over substantially the entire arm,
   characterized in that the fibers are continuous and are united in the form of a main continuous coiled skein of the first fibers extending along the rim, which encloses the anti-buckling portion.

2. The link arm according to claim 1, wherein the stiffening portion forms an outer peripheral shell for the arm comprising two substantially flat half-shells which form arm ribs reinforced by the main continuous coiled skein, wherein the anti-buckling portion is inserted between the half-shells.

3. The link arm according to claim 1, wherein the arm is used to equip a suspension of a wheel of a motor vehicle and comprises three housings arranged in a triangle respectively adapted to receive the first joint comprising a ball joint to a stub axle constituting the first structure or mass, and two second axial joints connecting to a chassis of the vehicle constituting the second structure or mass, and wherein the first fibers are selected from the group consisting of continuous carbon, glass, aramid, linen, basalt and combinations of at least two of the fibers.

4. The link arm (1, 1') according to claim 3, wherein the stiffening portion further comprises at least one connecting section which extends inwards of the rim to which it is connected and which delimits with the rim two reinforced areas on their respective perimeters, inwards and along the main continuous coiled skein in the rim and in the connecting section, by a first auxiliary skein of second continuous fibers, and by a second auxiliary skein of third continuous fibers.

5. The link arm according to claim 4, wherein the first auxiliary skein and the second auxiliary skein are each substantially unidirectional.

6. The link arm according to claim 5, wherein the second fibers and the third fibers are identical to the first fibers.

7. The link arm according to claim 5, wherein the first auxiliary skein and the second auxiliary skein are respectively enclosed in two auxiliary tubular sleeves.

8. The link arm according to claim 7, wherein said two auxiliary sleeves are either woven, knitted or braided.

9. The link arm according to claim 4, wherein one of the housings adapted to receive a second joint has a substantially circular edge defined by the rim and by another connecting section connected to the rim, wherein the edge is reinforced towards the inside of the main continuous coiled skein and the second auxiliary skein by a third auxiliary skein of the fourth continuous fibers.

10. The link arm according to claim 9, wherein the third auxiliary skein is substantially unidirectional.

11. The link arm according to claim 9, wherein the fourth fibers are identical to the first fibers, second fibers and third fibers.

12. The link arm according to claim 9, wherein the third auxiliary skein is enclosed in an auxiliary tubular sheath.

13. The link arm according to claim 12, wherein the auxiliary tubular sheath is either woven, knitted or braided.

14. The link arm according to claim 1, wherein the anti-buckling portion has at least one area having a perimeter located towards the inside of the rim which is not covered by the stiffening portion, so that the at least one area forms a web defining a minimum thickness for the arm.

15. The link arm according to claim 4, wherein the stiffening portion further comprises filling inserts which are located between the main continuous coiled skein and at least either the first auxiliary skein and second auxiliary skein, and/or in curved regions and/or in close proximity to the first joint, and/or the at least one second joint, wherein the filler inserts are particularly adapted to reduce the effects of folding or unfolding stresses applied to the arm in use and/or to oppose the fatigue crack starts and/or to oppose local buckling of the arm in the curved regions.

16. The link arm according to claim 4, wherein the housing adapted to receive the first joint formed by the ball, is formed on a plate as part of the arm and mounted in contact with the stiffening portion and the anti-buckling portion, wherein the plate encloses a portion of the rim.

17. The link arm according to claim 1, wherein the main continuous coiled skein is substantially unidirectional and is enclosed in a main tubular sheath.

18. The link arm according to claim 17, wherein the main tubular sheath is either woven, knitted or braided.

19. The link arm (1, 1') according to claim 1, wherein the anti-buckling portion comprises a web of a second composite material with thermoplastic or thermosetting matrix reinforced with fibers of webs identical or different from the fibers of the first composite material and which are selected from the group consisting of continuous carbon, glass, aramid, flax, basalt fibers and combinations of at least two of the fibers.

20. The link arm according to claim 19, wherein the web comprises at least two superposed layers of fabrics based on the web fibers.

21. The link arm according to claim 20, wherein said at least two superposed layers of fabrics are multiaxial tissues.

22. The link arm according to claim 1, wherein the anti-buckling portion comprises a web of a metallic material.

23. Method of manufacturing a link arm according to claim 1, wherein the stiffening portion comprises two half-shells superimposed on either side of the anti-buckling portion, wherein the method comprises the following steps:
   a) winding the main hank of the first continuous fibers on at least one mandrel to obtain a main skein for each half-shell,
   b) preforming the main skein on a main impression to obtain a main preform of each half-shell,
   c) inserting into a mold (M) of the main preform, the anti-buckling portion and the housings for the first joint and the at least one second joint, for both half-shells, and then
   d) injection into the mold of the thermoplastic or thermosetting matrix in contact with the main skein, the anti-buckling portion and the housings, to obtain the two half-shells superimposed and integral with the anti-buckling portion.

24. Method according to claim 23, wherein the method comprises the steps:
   a) winding on the at least one mandrel of the main hank, a first auxiliary hank of the second continuous fibers and a second auxiliary hank of the third continuous fibers, to obtain the main skein and first and second auxiliary skeins,
   b) preforming the main skein, the first auxiliary skein and the second auxiliary skein to obtain a preform comprising the main preform, a first auxiliary preform and a second auxiliary preform,
   c) inserting in the mold the main preform surrounding the first auxiliary preform and the second auxiliary preform, the anti-buckling portion and the housings, and
   d) injection into the mold of the matrix at least in contact with the main skein, the first auxiliary skein and the second auxiliary skein, the anti-buckling portion and the housing.

25. The link arm according to claim 1, wherein the first structure or mass is unsuspended and the second structure or mass is suspended.

* * * * *